H. & K. OLSEN.
Ditching-Machine.

No. 166,626.　　　　　　　　　　　Patented Aug. 10, 1875.

Attest:  
Wm. Bagger  
C. A. Snow

Inventor:  
Halvor Olsen & Knud Olsen,  
by Louis Bagger  
Atty.

UNITED STATES PATENT OFFICE.

HALVOR OLSEN AND KNUD OLSEN, OF TOKEN CREEK P. O., WISCONSIN.

IMPROVEMENT IN DITCHING-MACHINES.

Specification forming part of Letters Patent No. 166,626, dated August 10, 1875; application filed July 1, 1875.

*To all whom it may concern:*

Be it known that we, HALVOR OLSEN and KNUD OLSEN, of Token Creek P. O., in the county of Dane and State of Wisconsin, have invented certain new and useful Improvements in Ditching-Machines; and we do hereby declare that the following is a full, clear, and exact description thereof, which will enable others skilled in the art to which it pertains to make and use the same, reference being had to the accompanying drawings, and to the letters of reference marked thereon, which form a part of this specification, and in which—

Figure 1:
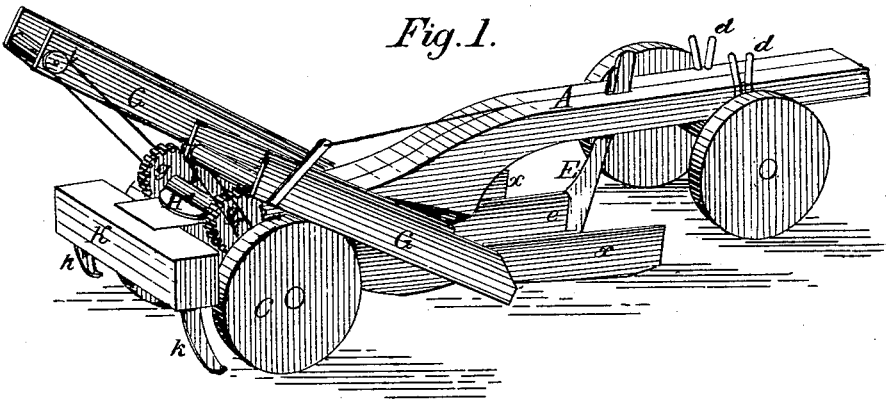
Figure 2:
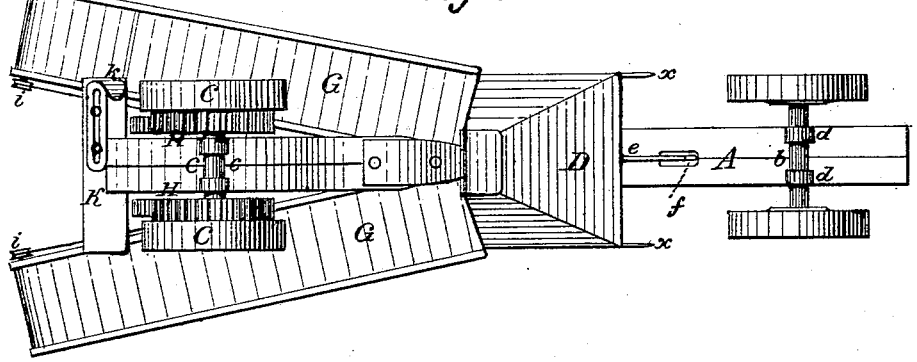
Figure 3:
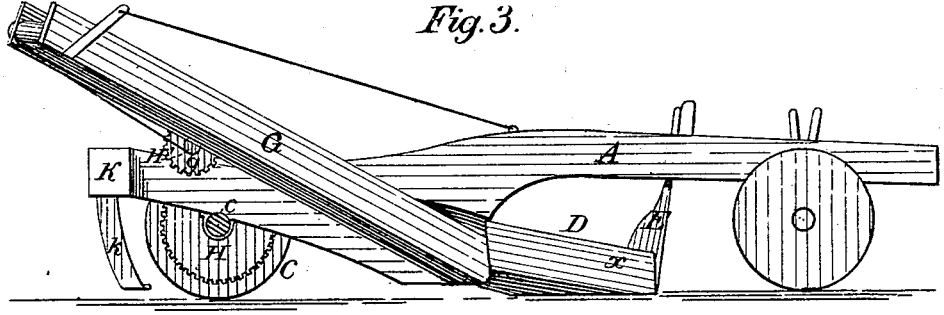

Figure 1 is a perspective view. Fig. 2 is a bottom plan; and Fig. 3 is a side elevation, one of the wheels being removed.

Similar letters of reference indicate corresponding parts in all the figures.

Our invention has for its object to produce a ditching-machine that, while being cheaply constructed and easily operated, will work in a satisfactory manner. It consists in the construction and arrangement of parts, substantially as hereinafter set forth.

In the drawing, A is the draft-beam. The rear part of this rests upon the axle $c$, having wheels C C. The front axle $b$ has its bearings in two arms or brackets, $d\ d$, projecting downward from beam A, to which they are secured adjustably, one on each side, in slots or guides, in such a manner that the front part of beam A may be raised or lowered at will, together with all its attachments, as hereinafter described. The middle part of beam A projects downwardly, so as to nearly reach the ground at its lowest point, where the shovel D is pivoted onto it. The latter consists of two sharp-edged side pieces, $x\ x$, and a cutter, $e$, arranged centrally between $x\ x$, that cut or furrow the soil operated upon in advance of the sharp-edged shovel D, which loosens the body of soil between the furrows thus made. The cutter $e$ divides the body of soil raised by the shovel in halves, ready to be lifted by the elevators G. The central cutter $e$ has a prolongation, E, which projects through a slot, $f$, in beam A, in which it may be secured in any suitable manner, so as to give the shovel D the proper pitch. An elevator, G, is affixed to each side of the beam A, for the purpose of receiving the dirt scooped up by the shovel D, and depositing it on both sides of the ditch as it is being dug. Gear-wheels H are attached concentrically to the inside of the drive-wheels C C, that engage with the pinions $g\ g$ upon the shaft H', which revolves in bearings upon beam A. The pulleys $i\ i$, by which the elevators G are operated, have endless belts, that run upon pulleys affixed to shaft H', and are thus enabled to operate the elevators G. To the rear of the beam A is affixed a cross-board, K, having two adjustable curved knives, $k\ k$, one on each side, intended to shape and clear the sides of the ditch as it is being dug by the machine.

From the above description the mode of operating our improved ditching-machine will be easily understood. The dirt, being scooped up by the shovel D, and divided by the cutter $e$, is, by the elevators G G, deposited on both sides of the ditch, which are cleared by the knives $k\ k$.

Having thus described our invention, we claim and desire to secure by Letters Patent—

1. In combination with a central draft-beam, A, and shovel D, the diverging fixed elevators G G, having pulleys $i$, operating endless bands, substantially as and for the purpose herein shown and specified.

2. The combination of the slotted draft-beam A, adjustable colter E, hinged shovel D, and diverging fixed elevators G G, all arranged and operating substantially as and for the purpose herein shown and specified.

In testimony that we claim the foregoing as our own we have hereunto affixed our signatures in presence of two witnesses.

HALVOR OLSEN.
KNUD OLSEN.

Witnesses:
JOHN DOUGLAS,
S. C. OMSBERG.